United States Patent
Huang et al.

(10) Patent No.: US 10,466,083 B2
(45) Date of Patent: Nov. 5, 2019

(54) SAFETY DESIGN METHOD OF ELECTROMAGNETIC FLOWMETER

(71) Applicant: FINETEK Co., Ltd., New Taipei (TW)

(72) Inventors: Chien-Lung Huang, New Taipei (TW); Chun-Ju Chen, New Taipei (TW); Chao-Kai Cheng, New Taipei (TW)

(73) Assignee: FINETEK CO., LTD., New Taipei (TW)

( * ) Notice: Subject to any disclaimer, the term of this patent is extended or adjusted under 35 U.S.C. 154(b) by 137 days.

(21) Appl. No.: 15/817,302

(22) Filed: Nov. 20, 2017

(65) Prior Publication Data
US 2019/0154477 A1    May 23, 2019

(51) Int. Cl.
*G01F 1/58* (2006.01)

(52) U.S. Cl.
CPC ...................... *G01F 1/58* (2013.01)

(58) Field of Classification Search
None
See application file for complete search history.

(56) References Cited

U.S. PATENT DOCUMENTS

| | | | | |
|---|---|---|---|---|
| 4,297,895 A * | 11/1981 | Gryn | ............ | G01F 15/12 73/861.12 |
| 4,297,896 A * | 11/1981 | May | ............ | G01F 15/12 73/861.12 |
| 4,297,897 A * | 11/1981 | Young | ............ | G01F 15/12 73/861.12 |
| 4,887,469 A * | 12/1989 | Shoptaw | ............ | G01F 1/065 73/861.77 |
| 9,506,752 B2 * | 11/2016 | Kuo | ............ | G01C 9/12 |
| 2007/0038390 A1 * | 2/2007 | Mansfield | ............ | G01F 1/8436 702/45 |
| 2012/0198931 A1 * | 8/2012 | Schulze | ............ | G01F 15/14 73/431 |
| 2015/0035695 A1 * | 2/2015 | Lin | ............ | G01F 23/284 342/124 |

FOREIGN PATENT DOCUMENTS

DE    3711754    * 10/1988    ............ G01F 1/58

* cited by examiner

*Primary Examiner* — Harshad R Patel
(74) *Attorney, Agent, or Firm* — Chun-Ming Shih; HDLS IPR Services

(57) ABSTRACT

A safety design method for an electromagnetic flowmeter is provided. The method includes following steps: providing an electromagnetic flowmeter including a measuring pipeline allowing a working fluid to flow through therein and a power supply module; defining a first explosion-proof hazardous area for containing the power supply module in the electromagnetic flowmeter; defining a second explosion-proof hazardous area for containing the measuring pipeline in the electromagnetic flowmeter; and separating the first explosion-proof hazardous area from the second explosion-proof hazardous area.

7 Claims, 8 Drawing Sheets

SAFETY DESIGN METHOD OF ELECTROMAGNETIC FLOWMETER

TECHNICAL FIELD

The present disclosure relates to an electromagnetic flowmeter, in particular to a safety design method of the electromagnetic flowmeter.

BACKGROUND

A conventional electromagnetic flowmeter lacks of complete explosion-proof design, the electromagnetic flowmeter is driven by electric power and a power supply should be arranged therein. The power supply generates heat during operation and therefore has high temperature. When the electromagnetic flowmeter is used for measuring volume flux of a flammable material, the flammable material tends to be ignited to explode in high temperature environment.

Only an electromagnetic flowmeter having safe isolation design can be applied on specific hazardous situation. It is an important issue as to how to design the internal structure of the flowmeter to isolate electric elements and effectively block the flammable gas and flame transmission and diffusion.

In views of this, in order to solve the above disadvantage, the present inventor studied related technology and provided a reasonable and effective solution in the present disclosure.

SUMMARY

An explosion-proof isolation safety design method of an electromagnetic flowmeter is provided in the present disclosure A safety design method of an electromagnetic flowmeter including following steps is provided in the present disclosure: providing an electromagnetic flowmeter, the electromagnetic flowmeter comprising a measuring pipeline and a power supply module, a working fluid being allowed to flow through the measuring pipeline; defining a first explosion-proof hazardous area in the electromagnetic flowmeter for containing the power supply module; defining a second explosion-proof hazardous area in the measuring pipeline for containing the electromagnetic flowmeter; and separating the first explosion-proof hazardous area from the second explosion-proof hazardous area.

According to the safety design method of the electromagnetic flowmeter of the present disclosure, the electromagnetic flowmeter comprises a transmitter and a sensor, the transmitter has a first housing, the first explosion-proof hazardous area is defined in the first housing, the sensor has a second housing, the second explosion-proof hazardous area is defined in the second housing. The safety design method of the electromagnetic flowmeter further comprises arranging an electrical module in a space defined by the first housing and the second housing, and the electrical module is arranged outside the second explosion-proof hazardous area. The electrical module is a data processing module for calculating a volume flux of the working fluid. The electrical module is a combination of at least one selected from a group of a circuit function module, a RF microwave module, a digital circuit. The circuit function module is a digital circuit, an analog circuit or a display function circuit, the digital circuit is a data calculation module for calculating a volume flux of the working fluid or an interface signal conversion module, the analog circuit is used for filtering noise from and amplifying the analog signal, the display function circuit is a data display module for displaying an electromagnetic flowmeter information. The RF microwave module is a wireless transmission chip module, the wireless transmission chip module comprises transmission antenna for receiving and transmitting a microwave signal.

According to the safety design method of the electromagnetic flowmeter of the present disclosure, a measuring module for electromagnetically measuring the working fluid is arranged in the measuring pipeline, the measuring module comprises a couple of electrodes and a couple of magnetic poles, each of the electrodes and the magnetic poles is connected to a wire harness, the respective wire harnesses penetrate the second explosion-proof hazardous area and further insert into the first explosion-proof hazardous area for electrical connection, and the first housing and the second housing are separated and isolated from each other. A first interface and a second interface communicated with the first interface are formed on the first housing, a cone joint is arranged on the first interface, a cone plug is arranged on the second interface, and the cone plug is plugged in the cone joint.

According to the safety design method of the electromagnetic flowmeter of the present disclosure, a measuring module for electromagnetically measuring the working fluid is arranged in the measuring pipeline, the measuring module comprises a couple of electrodes and a couple of magnetic poles, each of the electrodes and the magnetic poles is connected to a wire harness, the respective wire harnesses penetrate the second explosion-proof hazardous area and further insert into the first explosion-proof hazardous area for electrical connection, and the first housing is communicated with the second housing. A first interface is formed on the first housing, a second interface communicated with the first interface is formed on the second housing, a cone joint is arranged on the first interface, a cone plug is arranged on the second interface, and the cone plug is plugged in the cone joint.

According to the structure arrangement of electromagnetic flowmeter recited in the present disclosure, three areas zone 0, 1 and 2 according to hazardous area classification are defined according to structure arrangement electromagnetic flowmeter, a rule designed to restrict various electric elements in respective location is provided in the present disclosure. In particular, the measuring module should be arranged in the zone 0, the power supply module should be arranged in the zone 2, and the other electrical modules arranged according to various structure arrangement. Thereby, a complete and safe electromagnetic flowmeter could be designed according to the safety design method.

BRIEF DESCRIPTION OF DRAWING

The present disclosure can be more fully understood by reading the following detailed description of the embodiment, with reference made to the accompanying drawings as follows.

DETAILED DESCRIPTION

The possible areas such as drilling ports, oil port, oil and gas port, boiler area, biogas area, sewer, tunnel, filling station, organic gas zone, spraying area, shale oil area, combustible ice area, etc. Explosion-proof design can be divided into two parts: body safety (intrinsically safe) and structural isolation. The body safety system is designed for the electronic components, so that its electronic components are not easy to ignite flammable materials. Isolates the electronic component from the combustible material to prevent the flammable material from being ignited by the electronic component. Hazardous locations are classified as hazardous areas of Zone 0, Zone 1 and Zone 2 according to a mixture time of an explosive gas and air high to low. There hazardous locations may exist in gas stations, medical centers, central kitchens, power plants, wineries, oil and gas transportation stations, sewage stations, ammunition depots, semiconductor industries, gas sub-stations, ports, oil tankers, steel industry, aviation industry, military engineering, petrochemical industry, food industries, machinery industries, transportation track, communication industries, paper industries, pharmaceutical industries and so on. There hazardous locations may be exist is areas such as drilling port, oil discharge port, oil and gas port, boiler area, biogas area, sewer, tunnel, filling station, organic gas area, spray painting area, shale oil area, combustible ice area and so on Explosion-proof design can be divided into means of intrinsically safety and structural isolation, the means of intrinsically safety is a safety design of electronic components, so that the electronic components are inflammable; the means of structural isolation is a structural separating the electronic components from flammable materials to prevent the electronic components from being ignited by the flammable materials. An explosion-proof arrangement is provided in the electromagnetic flowmeter.

Figure 1:
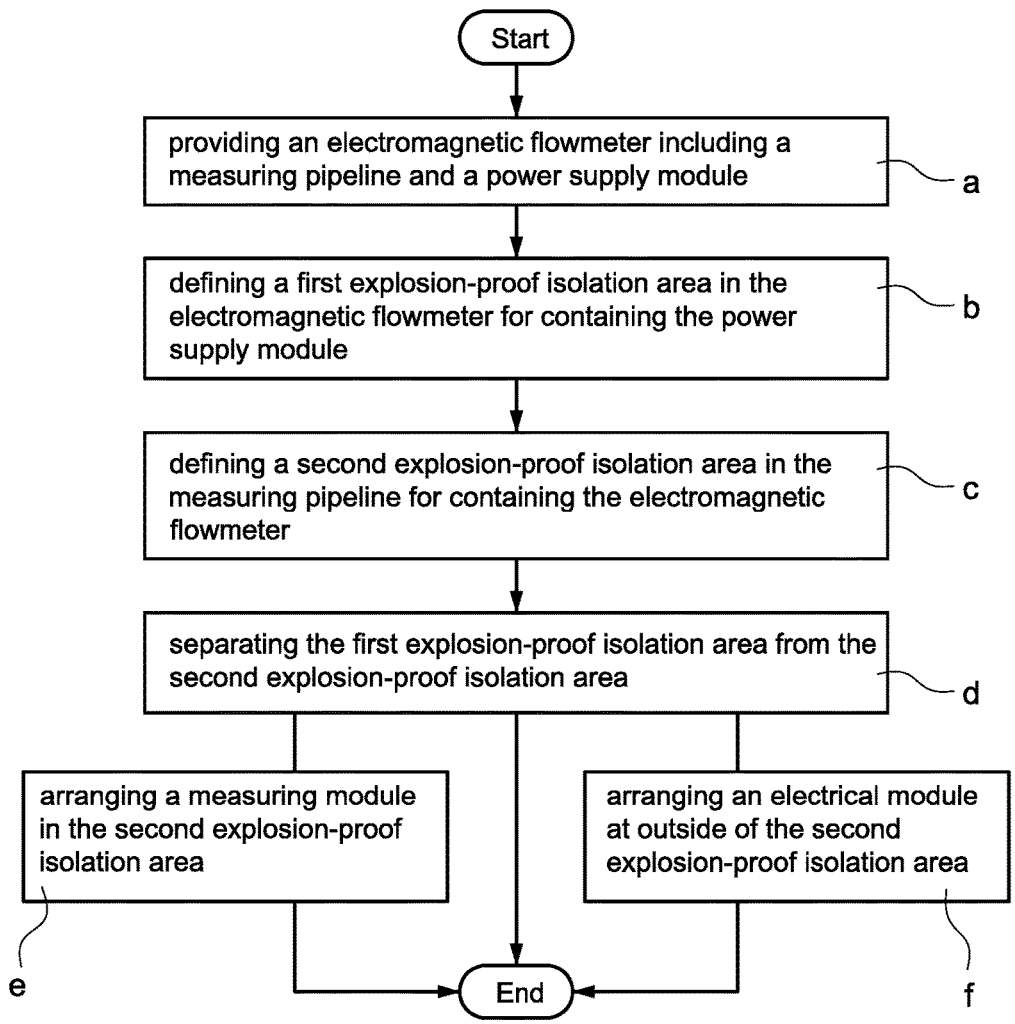
FIG. 1 is a flowchart showing a safety design method for an electromagnetic flowmeter of the present disclosure.
Figure 2:
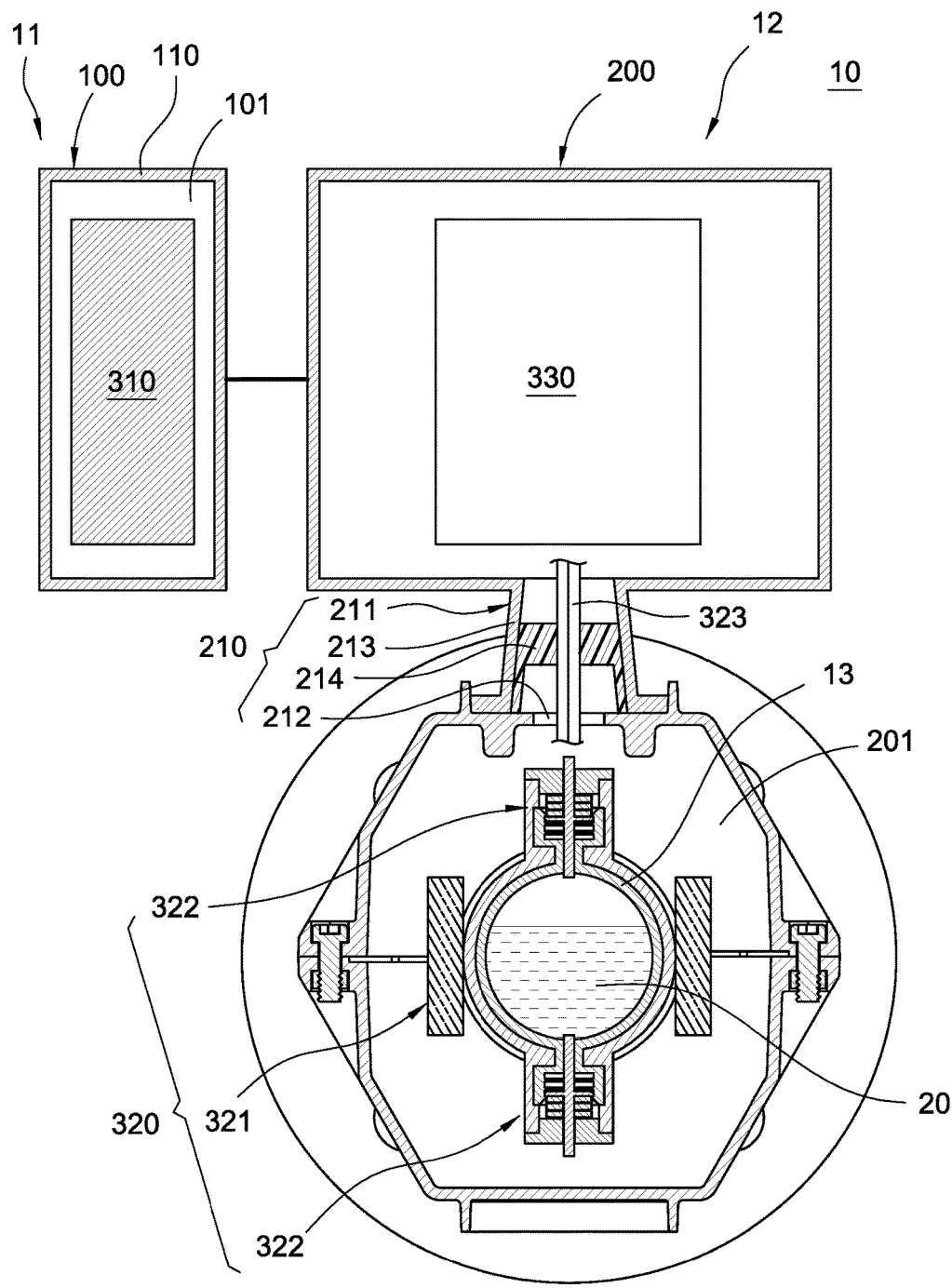
FIGS. 2 and 3 are schematic views showing the safety design method for an electromagnetic flowmeter of the first embodiment of the present disclosure.

According to FIGS. 1 and 2, a safety design method for an electromagnetic flowmeter including following steps is provided in the first embodiment of the present disclosure:

Firstly, providing an electromagnetic flowmeter 10 in step a, the electromagnetic flowmeter 10 includes a measuring pipeline 13 and a power supply module 310, a working fluid 20 is allowed to flow through the measuring pipeline 13, and the working fluid 20 is flammable or combustible.

In a step b following the step a, a first explosion-proof isolation structure 110 is arranged in the electromagnetic flowmeter 10 and a first explosion-proof hazardous area 101 containing the power supply module 310 is thereby defined in the electromagnetic flowmeter 10, and the first explosion-proof hazardous area 101 is a sealed space. According to the present embodiment, the first explosion-proof hazardous area 101 is defined by mechanical means of explosion-proof such as the first explosion-proof isolation structure 110. However, scope of the present disclosure should not be limited to the embodiment, the first explosion-proof hazardous area 101 could alternatively be defined by electrical means of explosion-proof. The first explosion-proof hazardous area 101 is zone 2 according to hazardous area classification namely the least hazardous area.

In a step c following the step b, a second explosion-proof isolation structure 210 is arranged in the electromagnetic flowmeter 10 and a second explosion-proof hazardous area 201 containing the measuring pipeline 13 is thereby defined in the electromagnetic flowmeter 10, and the second explosion-proof hazardous area 201 is a sealed space. According to the present embodiment, the second explosion-proof hazardous area 201 is defined by mechanical means of explosion-proof such as the second explosion-proof isolation structure 210. However, scope of the present disclosure should not be limited to the embodiment, the second explosion-proof hazardous area 201 could alternatively be defined by electrical means of explosion-proof. The second explosion-proof hazardous area 201 zone 0 according to hazardous area classification namely the most hazardous area. The other spaces in the electromagnetic flowmeter 10 excluding the first explosion-proof hazardous area 101 and the second explosion-proof hazardous area 201 are zone 0 according to hazardous area classification namely the less hazardous area.

In a step d following the step c, the first explosion-proof hazardous area 101 is separated from the second explosion-proof hazardous area 201. According to the present disclosure, the electromagnetic flowmeter 10 includes a transmitter 11 and a sensor 12, the transmitter 11 has a first housing 100, the first explosion-proof isolation structure 110 is arranged in the first housing 100 and the first explosion-proof hazardous area 101 is thereby defined in the first housing 100. Namely, the whole first housing 100 is the first explosion-proof isolation structure 110 and the first explosion-proof hazardous area 101 is thereby defined in the first housing 100. The sensor 12 has a second housing 200 separated and isolated from the first housing 100, the second explosion-proof isolation structure 210 is arranged in the second housing 200 and the second explosion-proof hazardous area 201 is thereby defined in the second housing 200. Thereby, the first explosion-proof hazardous area 101 is separated from the second explosion-proof hazardous area 201.

Figure 3:
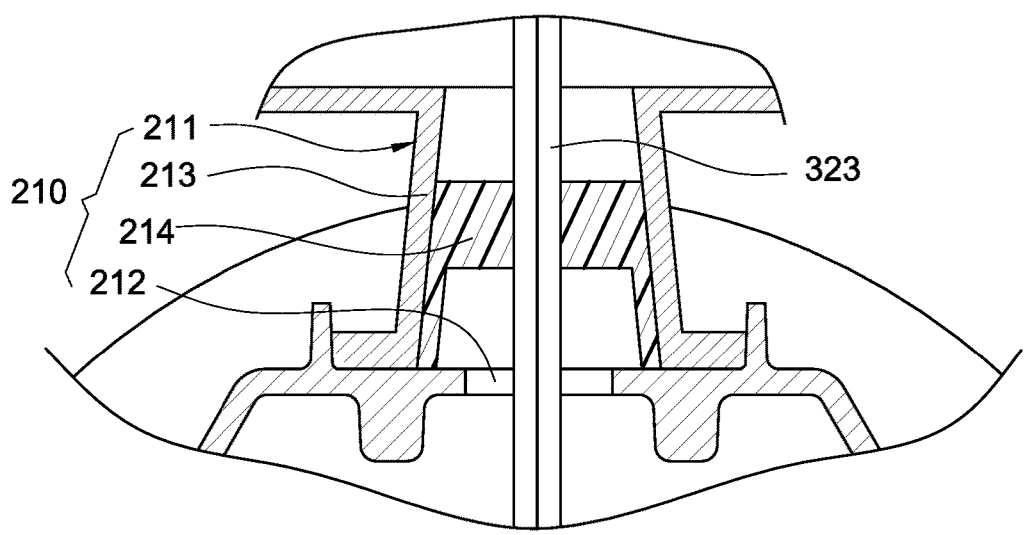

According to FIGS. 2 and 3, structures of the second explosion-proof isolation structure 210 are specifically described below, a first interface 211 and a second interface 212 and communicated with the first interface 211 are formed on the second housing 200, the second explosion-proof isolation structure 210 includes a cone joint 213 arranged on the first interface 211 and a cone plug 214 arranged on the second interface 212, the cone plug 214 is plugged in the cone joint 213, and respective tips of the cone joint 213 and the cone plug 214 are arranged toward a direction far from the second explosion-proof hazardous area 201. When the working fluid 20 leaks from the measuring pipeline 13, the working fluid 20 is blocked out by double barrier such as the first explosion-proof isolation structure 110 and the second explosion-proof isolation structure 210 and is not able to enter the first explosion-proof hazardous area 101, and the leaking working fluid 20 is therefore prevented from being ignited by high temperature power supply module 310.

The safety design method for an electromagnetic flowmeter further includes a step e: arranging a measuring module 320 in the second explosion-proof hazardous area 201, the measuring module 320 is used for electromagnetically measuring the working fluid 20. The measuring module 320 includes a couple of electrodes 321 and a couple of magnetic poles 322, and the magnetic poles 322 are preferably coils. Each of the electrodes 321 and the magnetic poles 322 is connected with a wire harness 323, and the respective wire harnesses 323 penetrate the cone plug 214 of the second explosion-proof isolation structure 210 and further electrically connect to the transmitter 11. When the working fluid 20 leaks into the second explosion-proof hazardous area 201 from the measuring pipeline 13, pressure in the second explosion-proof hazardous area 201 increase and the cone plug 214 is therefore pushed toward the tip of the cone joint 213 and the cone joint 213 presses the cone plug 214. Therefore, the cone plug 214 is compressed and fit contacted with the wire harness 323 to further avoid the working fluid 20 leaking out from the second explosion-proof hazardous area 201.

The safety design method for an electromagnetic flowmeter further includes a step f: arranging at least an electrical module 330 in a space defined by the first housing 100 and the second housing 200, and the electrical module 330 is located at outside of the second explosion-proof hazardous area 201 and thereby explosion-proof isolated from the measuring pipeline 13.

The electrical module 330 could be a data processing module for calculating a volume flux of the working fluid; the electrical module 330 could alternatively be one of a circuit function module, a RF (radio frequency) microwave module, and a digital circuit, or a combination of two or more thereof.

Specifically, the circuit function module could be a digital circuit, an analog circuit or a display function circuit; the circuit function module could alternatively be a data calculation module for calculating a volume flux of the working fluid, the circuit function module could alternatively be a data display module for displaying an electromagnetic flowmeter information. The RF microwave module is a wireless transmission chip module, and the wireless transmission chip module includes a transmission antenna for receiving and transmitting a microwave signal. The digital circuit is a digital operation and interface signal conversion module.

Figure 4:
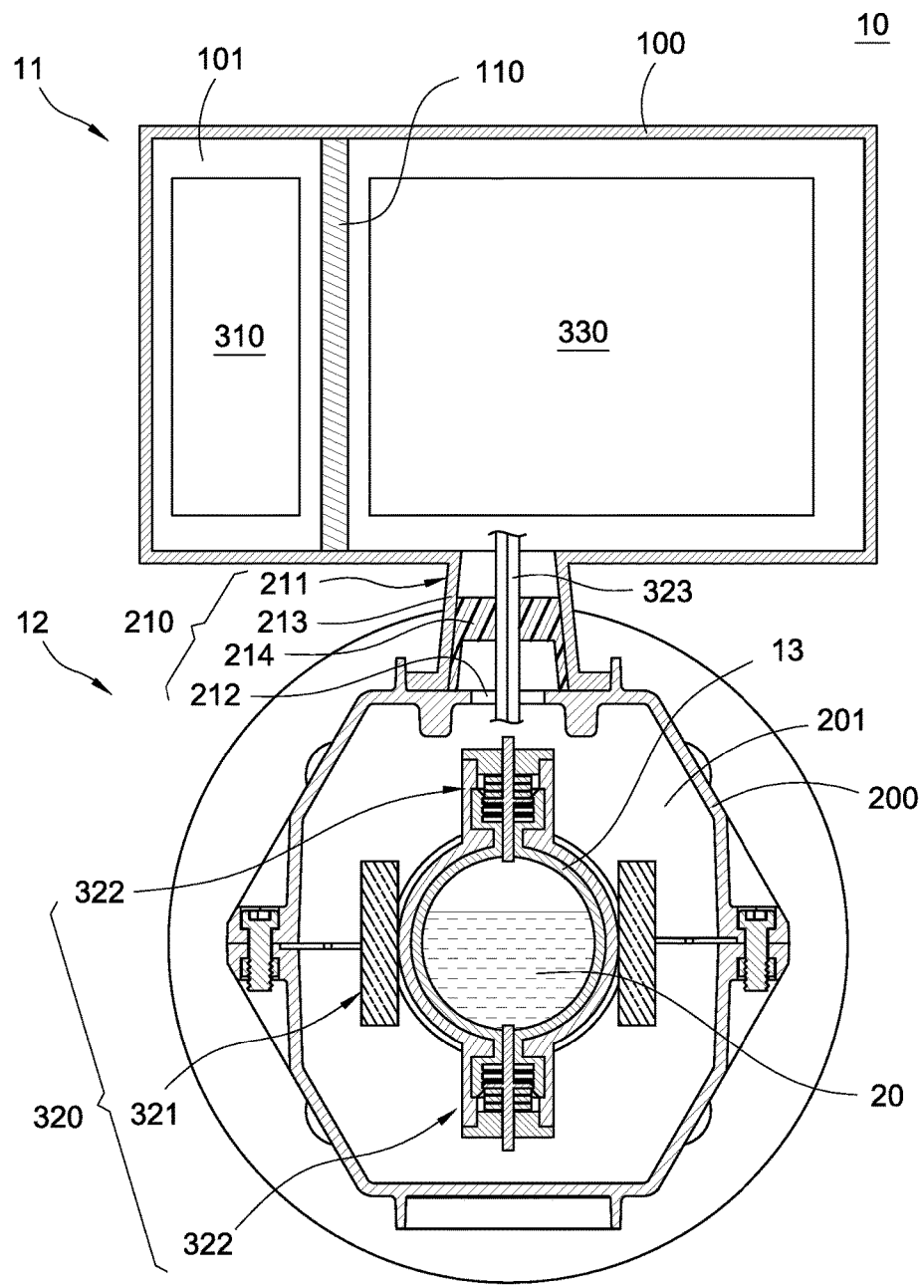
FIG. 4 is a schematic view showing the safety design method for an electromagnetic flowmeter of the second embodiment of the present disclosure.
Figure 5:
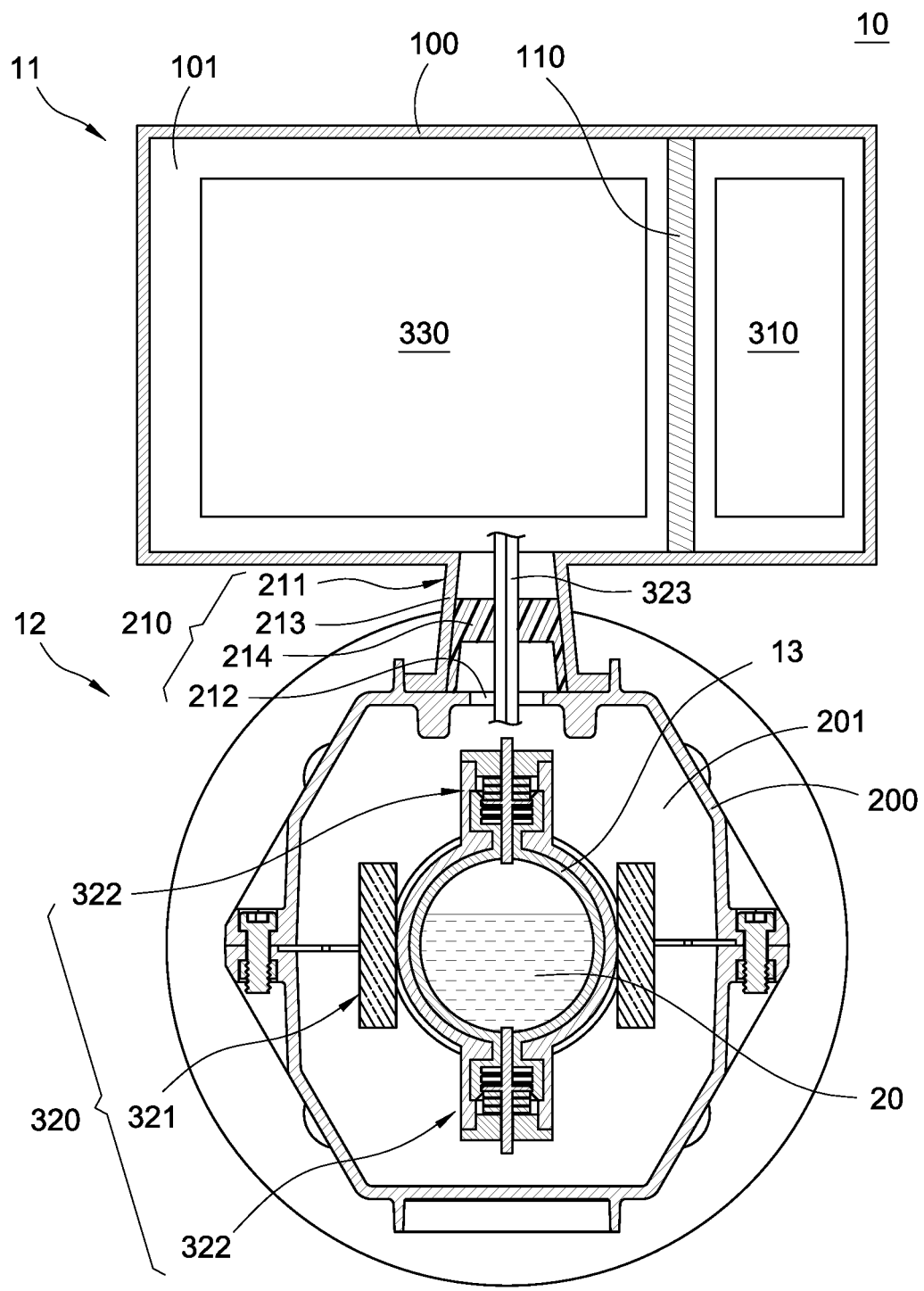
FIGS. 5 to 8 are schematic views showing various type of the safety design method for an electromagnetic flowmeter of the second embodiment of the present disclosure.
Figure 6:
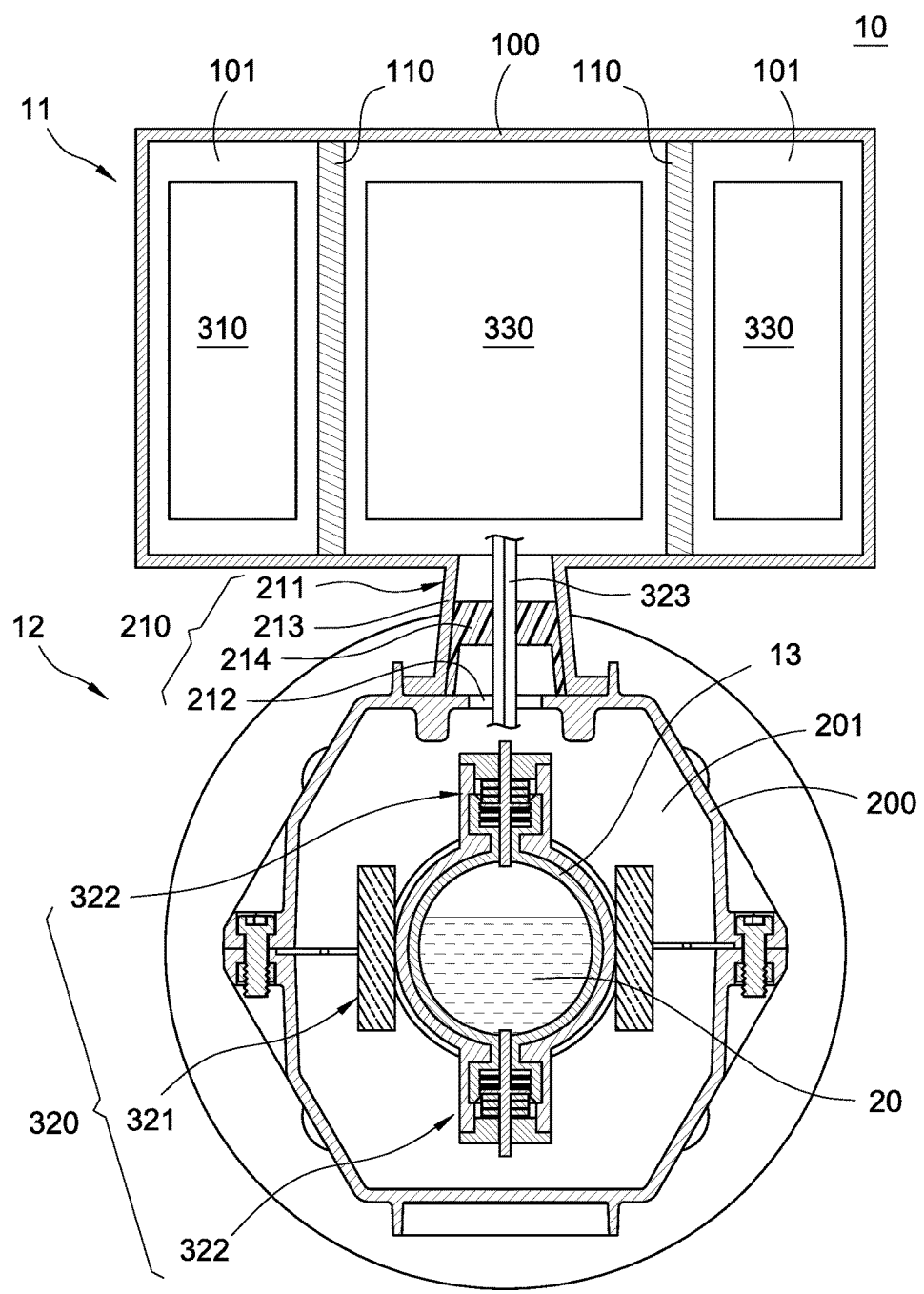
Figure 7:
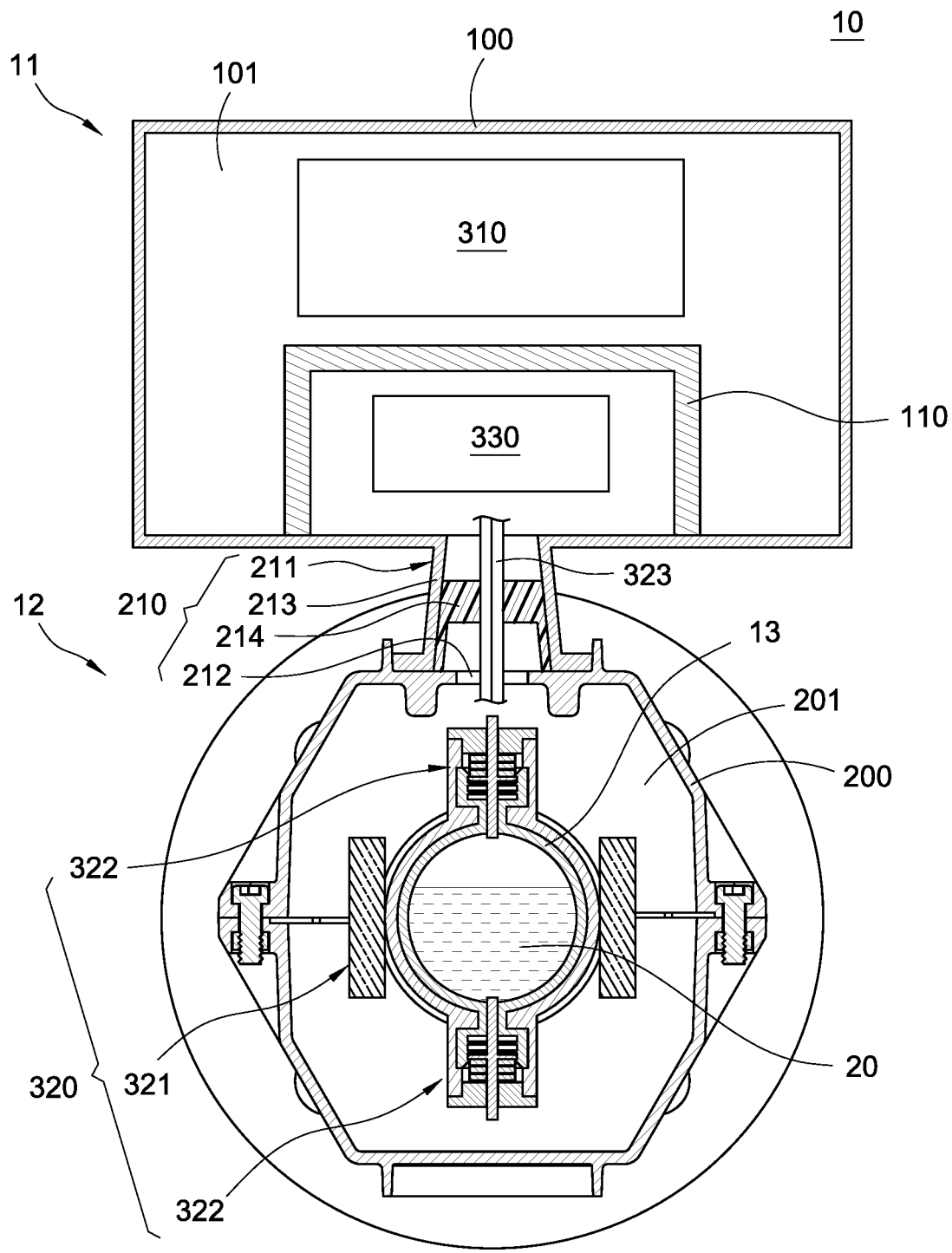
Figure 8:
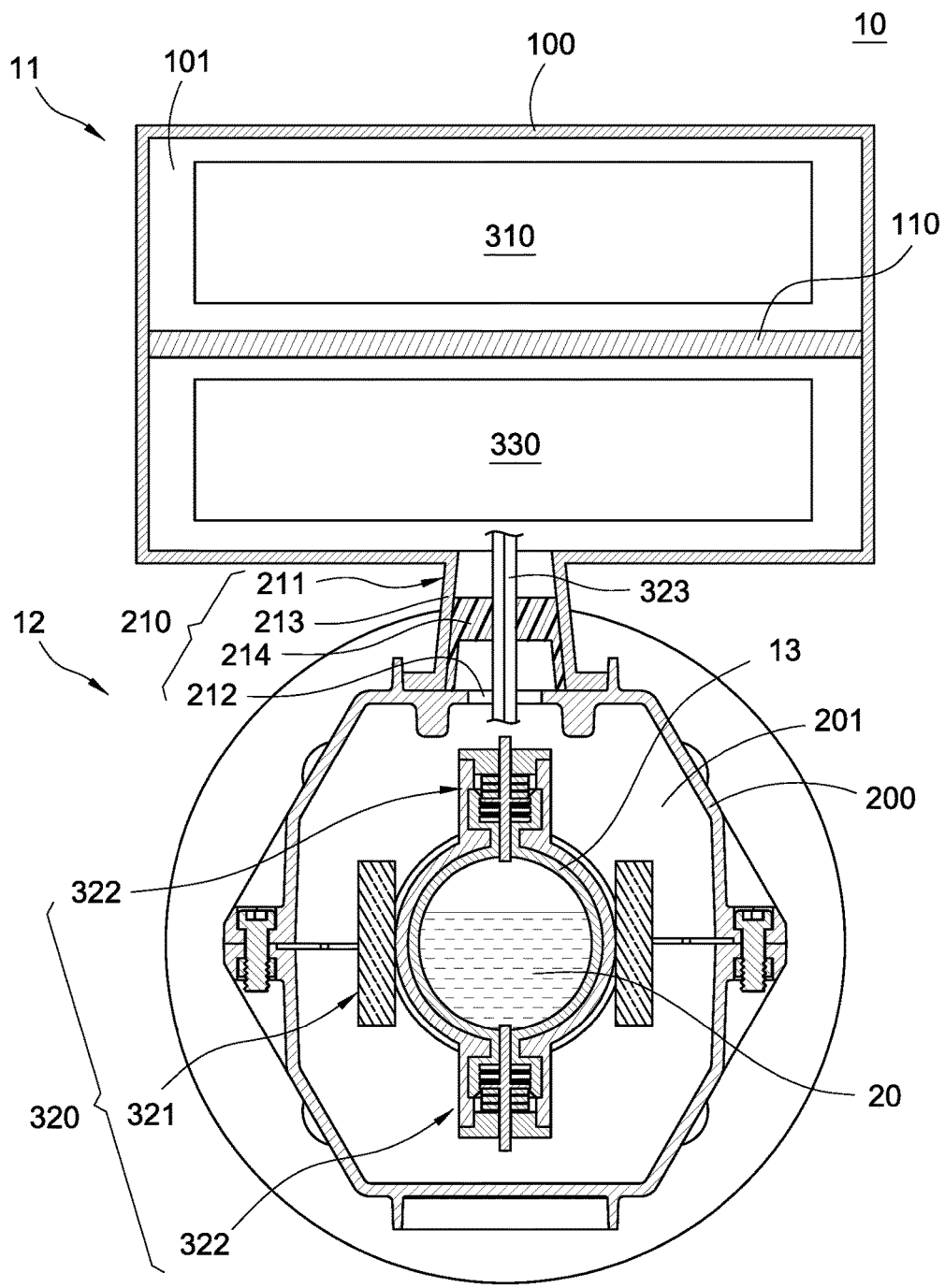

According to FIGS. 1 and 4, a safety design method of an electromagnetic flowmeter including following steps is provided in the second embodiment of the present disclosure:

Step a: providing an electromagnetic flowmeter 10, the electromagnetic flowmeter 10 includes a measuring pipeline 13 and a power supply module 310, a working fluid 20 is allowed to flow through the measuring pipeline 13. Step b: arranging a first explosion-proof isolation structure 110 in the electromagnetic flowmeter 10 and a first explosion-proof hazardous area 101 containing the power supply module 310 is thereby defined in the electromagnetic flowmeter 10 的. Step c: arranging a second explosion-proof isolation structure 210 in the electromagnetic flowmeter 10 and a second explosion-proof hazardous area 201 containing the measuring pipeline 13 is thereby defined in the electromagnetic flowmeter 10. Step d: Separating the first explosion-proof hazardous area 101 from the second explosion-proof hazardous area 201.

According to the present embodiment, the measuring pipeline 13, the power supply module 310 and the electrical module 330 are the same as the first embodiment, and the steps a to c, e and f are the same as the first embodiment, and are not repeated in the present embodiment. What is different from the first embodiment of the present embodiment is described below.

The step d of the present embodiment is different from the first embodiment, the electromagnetic flowmeter 10 includes a transmitter 11 and a sensor 12. The transmitter 11 has a first housing 100, the first explosion-proof isolation structure 110 is arranged in the first housing 100 and the first explosion-proof hazardous area 101 is thereby defined in the first housing 100. The sensor 12 has a second housing 200 communicated with the first housing 100, the second explosion-proof isolation structure 210 is arranged in the second housing 200 and the second explosion-proof hazardous area 201 is thereby defined in the second housing 200.

Structures of the second explosion-proof isolation structure 210 are specifically described below, a first interface 211 is formed on the first housing 100, a second interface 212 communicated with the first interface 211 is formed on the second housing 200, the second explosion-proof isolation structure 210 includes a cone joint 213 arranged on the first interface 211 and a cone plug 214 arranged on the second interface 212, the cone plug 214 is plugged in the cone joint 213, and respective tips of the cone joint 213 and the cone plug 214 are arranged toward a direction far from the second explosion-proof hazardous area 201. Accordingly, while the working fluid 20 leaks from the measuring pipeline 13, the working fluid 20 is blocked by double barriers such as the first explosion-proof isolation structure 110 and second explosion-proof isolation structure 210 and thereby cannot enter the first explosion-proof hazardous area 101, the leaking working fluid 20 is thereby prevented from ignited by the high temperature power supply module 310.

According to the present disclosure, type and quantity of the first explosion-proof isolation structure 110 are not limited, namely quantity of the first explosion-proof hazardous area 101 is not limited, various types of the first explosion-proof isolation structure 110 and various arrangement of the electrical module 330 are shown in FIGS. 5 to 8. The electrical module 330 could be arranged in a zone 1 in the first housing 100 or in the second housing 200, the electrical module 330 could alternatively be arranged in a zone 2 in the first housing 100.

Electric elements recited in the present disclosure includes power supply module 310, measuring module 320 and other electrical modules 330, and specific zones are defined in the electromagnetic flowmeter 10, specific relationship between the electric elements and the respective zones are designed in the present disclosure. To enhance safety, double barriers are provided and meet the safety requirements of explosion-proof. In the present disclosure, zones 0, 1 and 2 according to hazardous area classification are defined in the electromagnetic flowmeter according to where the respective elements located, and each element is arranged in a corresponding area according to function thereof. In particular, the measuring module 320 is arranged in zone 0 the power supply module 310 is arranged in zone 2, and the other electrical modules 330 are arranged according to various structure arrangement. The respective electric elements in respective area are meet the requirements of explosion-proof rule and temperature limitation, and the respective electric elements are thereby protected and transition of flammable gas and flame are thereby blocked.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the present disclosure as defined in the appended claims.

What is claimed is:

1. A safety design method of an electromagnetic flowmeter for applying hazardous area, comprising following steps:
   a) providing an electromagnetic flowmeter, the electromagnetic flowmeter comprising a measuring pipeline and a power supply module, a working fluid being allowed to flow through the measuring pipeline;
   b) defining a first explosion-proof hazardous area in the electromagnetic flowmeter for containing the power supply module;

c) defining a second explosion-proof hazardous area in the electromagnetic flowmeter for containing the measuring pipeline; and d) separating the first explosion-proof hazardous area from the second explosion-proof hazardous area, wherein the electromagnetic flowmeter comprises a transmitter and a sensor, the transmitter has a first housing, the first explosion-proof hazardous area is defined in the first housing, the sensor has a second housing, and the second explosion-proof hazardous area is defined in the second housing;

wherein a measuring module for electromagnetically measuring the working fluid is arranged in the measuring pipeline, the measuring module comprises a couple of electrodes and a couple of magnetic poles, each of the electrodes and the magnetic poles is connected to a wire harness, the respective wire harnesses penetrate the second explosion-proof hazardous area and further insert into the first explosion-proof hazardous area for electrical connection; and wherein a first interface and a second interface communicated with the first interface are provided between the first housing and the second housing, a cone joint is arranged on the first interface, a cone plug is arranged on the second interface, and the cone plug is plugged in the cone joint, and the respective wire harnesses penetrate the cone plug.

2. The safety design method of the electromagnetic flowmeter according to claim 1, further comprises arranging an electrical module in a space defined by the first housing and the second housing, and the electrical module is arranged outside the second explosion-proof hazardous area.

3. The safety design method of the electromagnetic flowmeter according to claim 2, wherein the electrical module is a data processing module for calculating a volume flux of the working fluid.

4. The safety design method of the electromagnetic flowmeter according to claim 2, wherein the electrical module is one or a combination of a circuit function module, a RF microwave module and a digital circuit module.

5. The safety design method of the electromagnetic flowmeter according to claim 4, wherein the circuit function module is a digital circuit, an analog circuit or a display function circuit, the digital circuit is a data calculation module for calculating a volume flux of the working fluid or an interface signal conversion module, the analog circuit is used for filtering noise from and amplifying an analog signal, the display function circuit is a data display module for displaying an electromagnetic flowmeter information.

6. The safety design method of the electromagnetic flowmeter according to claim 4, wherein the RF microwave module is a wireless transmission chip module, the wireless transmission chip module comprises a transmission antenna for receiving and transmitting a microwave signal.

7. The safety design method of the electromagnetic flowmeter according to claim 1, wherein the first housing and the second housing are separated and isolated from each other.

* * * * *